Figure 1:
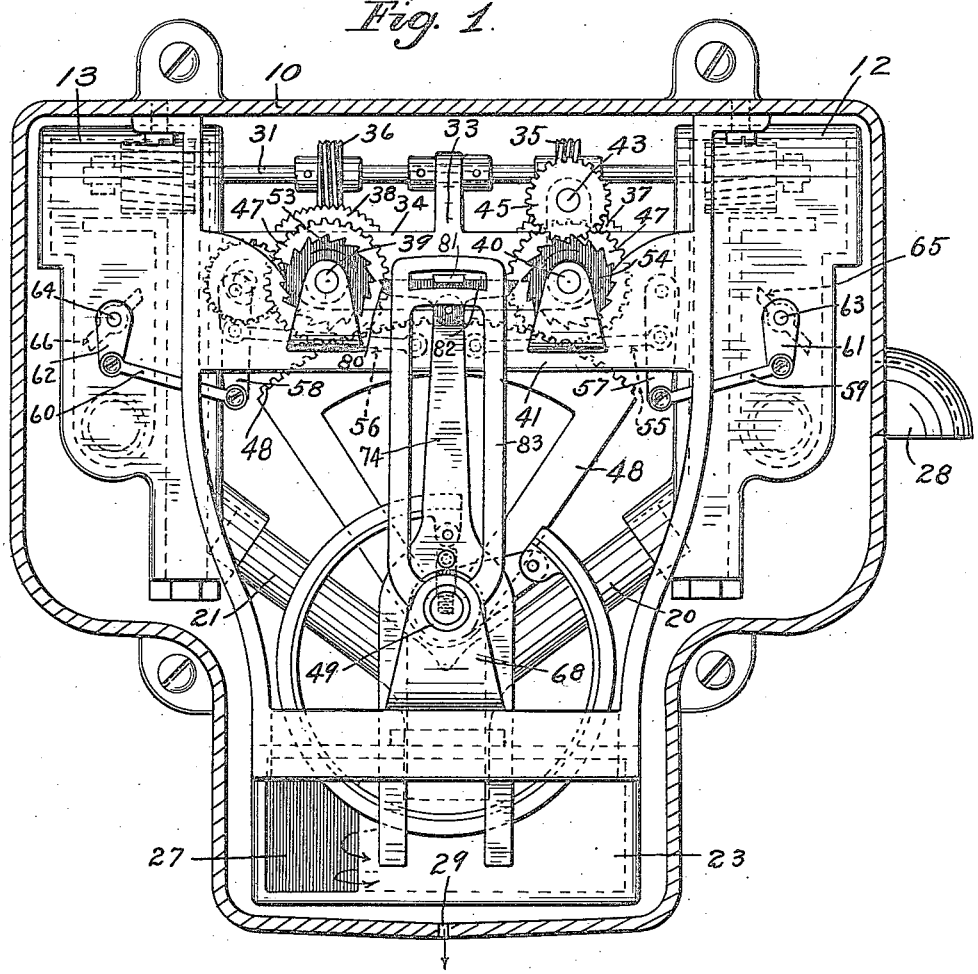

K. DOUGAN.
TEMPERATURE GOVERNOR FOR FLUIDS.
APPLICATION FILED JULY 31, 1913.

1,224,614.

Patented May 1, 1917.
4 SHEETS—SHEET 1.

Witnesses
Robert W. Muir
H. A. Bowman

Inventor
Kennedy Dougan
By F. A. Whiteley
His Attorney

K. DOUGAN.
TEMPERATURE GOVERNOR FOR FLUIDS.
APPLICATION FILED JULY 31, 1913.

1,224,614. Patented May 1, 1917.
4 SHEETS—SHEET 2.

Witnesses
Robert W. Muir
H. G. Bowman

Inventor
Kennedy Dougan
By F. G. Whiteley
His Attorney

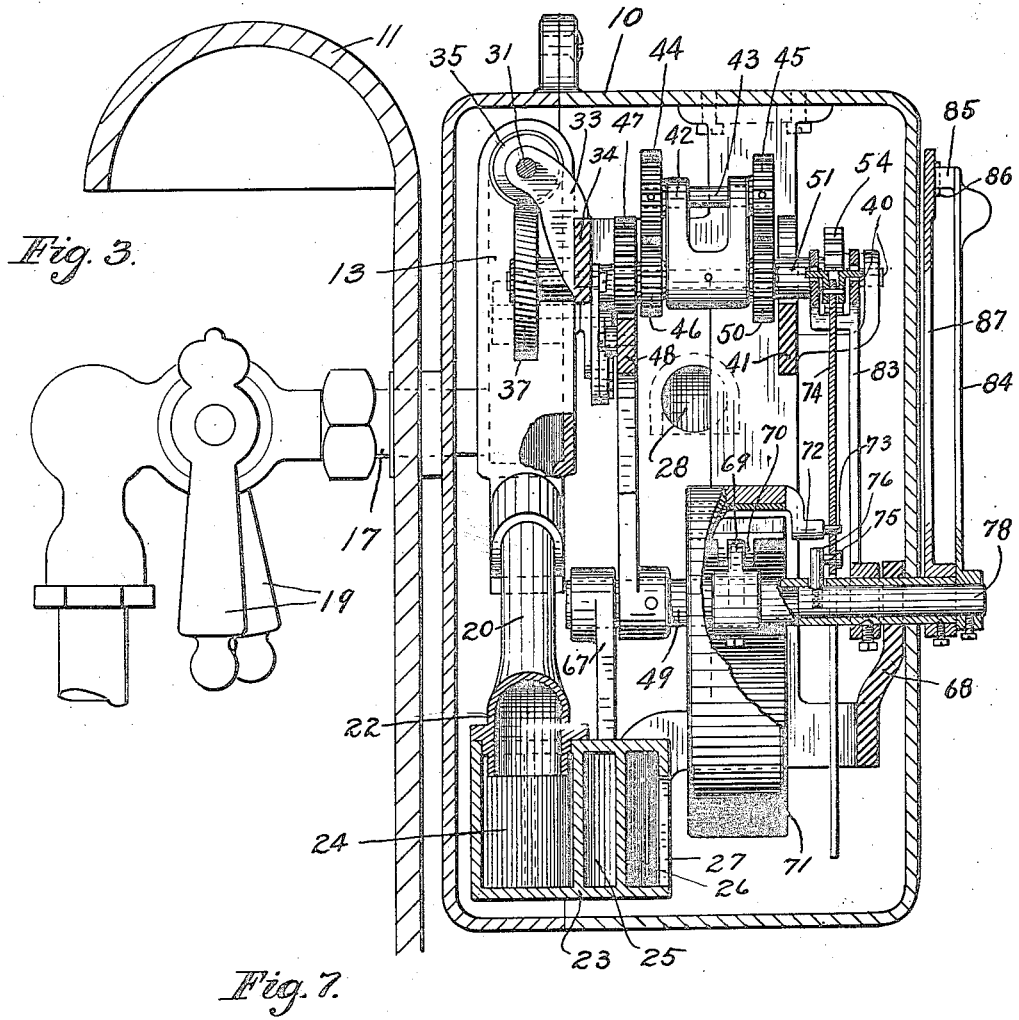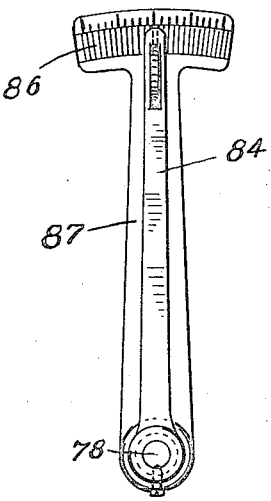

K. DOUGAN.
TEMPERATURE GOVERNOR FOR FLUIDS.
APPLICATION FILED JULY 31, 1913.

1,224,614. Patented May 1, 1917.
4 SHEETS—SHEET 4.

Witnesses
Robert W. Muir
H. A. Bowman

Inventor
Kennedy Dougan
By G. A. Whiteley
His Attorney

UNITED STATES PATENT OFFICE.

KENNEDY DOUGAN, OF MINNEAPOLIS, MINNESOTA.

TEMPERATURE-GOVERNOR FOR FLUIDS.

1,224,614.  Specification of Letters Patent.  Patented May 1, 1917.

Application filed July 31, 1913. Serial No. 782,242.

*To all whom it may concern:*

Be it known that I, KENNEDY DOUGAN, a citizen of the United States, residing at Minneapolis, in the county of Hennepin and State of Minnesota, have invented certain new and useful Improvemets in Temperature-Governors for Fluids, at which the following is a specification.

My invention relates to means for governing the temperature of fluid mixtures, and has for its object to provide means for automatically controlling the mixture of two fluids of different temperatures so that the proportions of the respective fluids shall be such as to deliver a mixture of a desired temperature. This invention is illustrated as applied to bath tubs in which the mixture of hot and cold water for bathing purposes can be regulated to give a bath temperature such as may be desired by the user; but it will be obvious that the principles of my invention are applicable to any employment in which it is desirable to mix fluids of different temperatures in order to get a resultant mixture of a desired temperature different from that of either of the component parts of the mixture.

I accomplish the governing and controlling of the fluid mixture by the employment of motion governing mechanism such as that illustrated and described in my co-pending application, Serial No. 442,790, filed July 9, 1908, of which this application is a continuation in part, said application having since the filing of this application eventuated into Patent No. 1,071,895, granted September 2, 1913.

The full objects and advantages of my invention will appear in connection with the detailed description thereof and are particularly pointed out in the claims.

In the drawings, illustrating the application of my invention in one form,—

Figure 2:
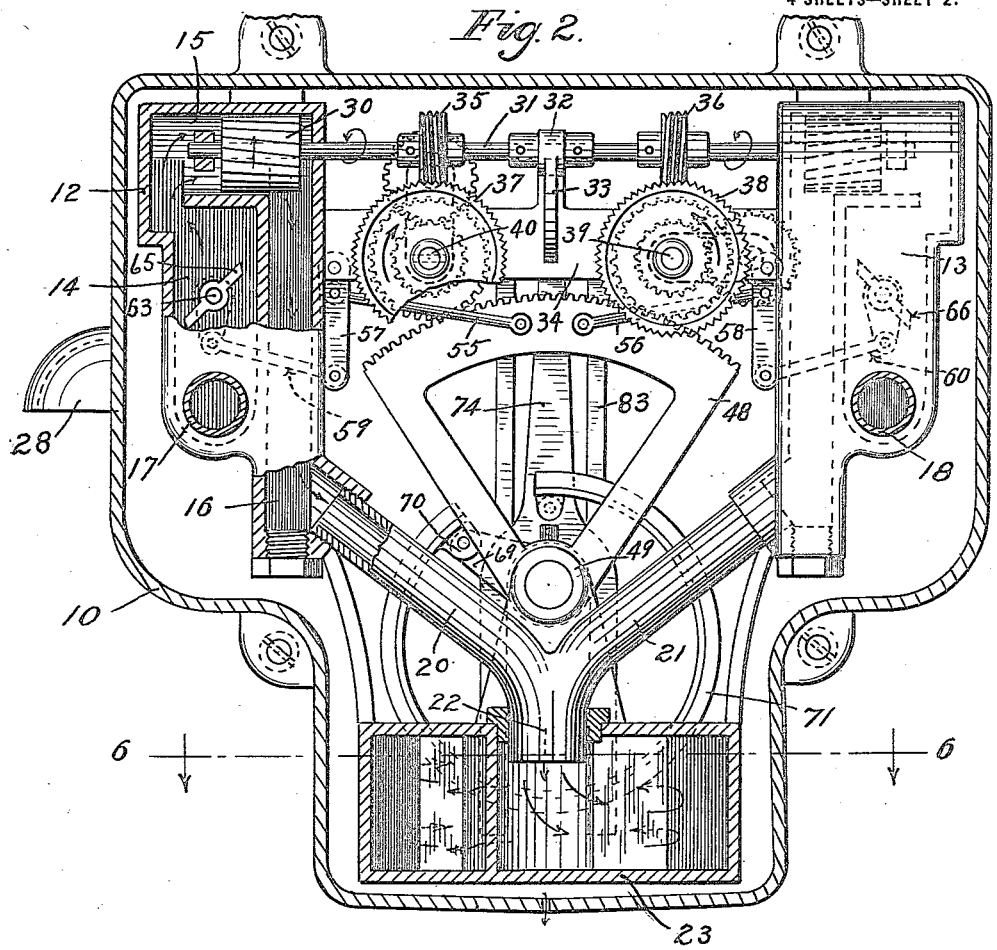
Figure 6:
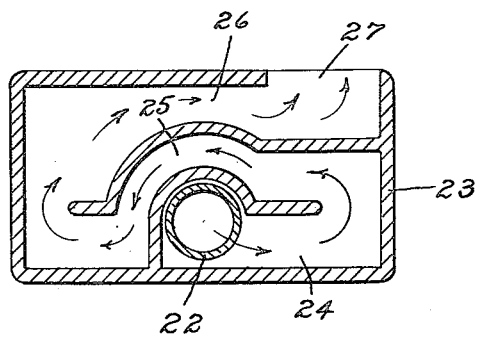
Figure 4:
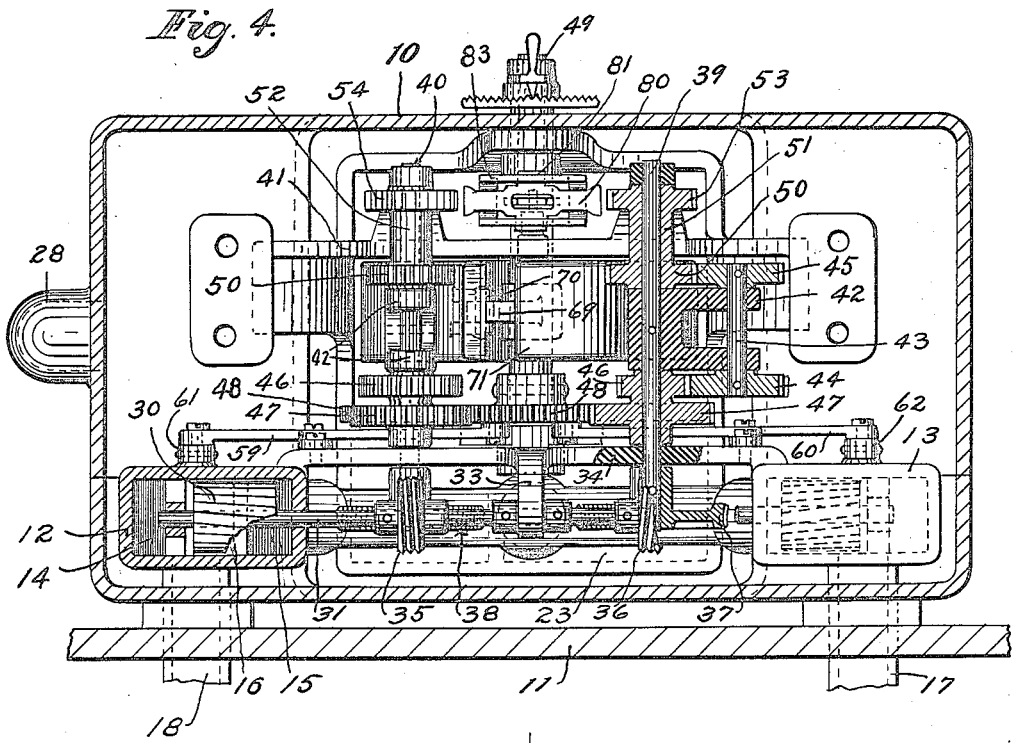
Figure 5:
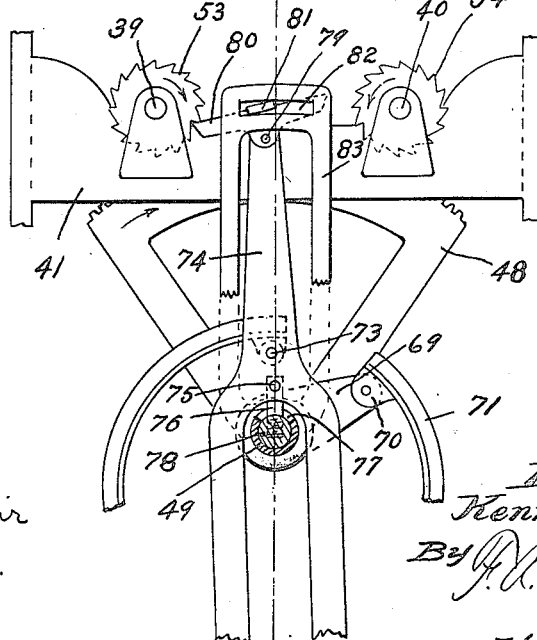

Figures 1 and 2 are elevation views of my device from opposite sides thereof with the walls of the mixing chamber removed and some parts broken away. Fig. 3 is a similar end elevation, also with some parts broken away. Fig. 4 is a top plan view with the top casing removed. Fig. 5 is a detail fragmentary view of parts shown in Fig. 1 with the governing element in a different position. Fig. 6 is a section on line 6—6 of Fig. 2. Fig. 7 is a detail view of the temperature indicating lever.

My water-mixing apparatus is indicated as a casing 10, preferably formed of two parts integrally united, as shown, said casing being secured to the interior wall 11 of the bath tub in any desired way. The casing 10 will form a substantially water tight chamber and provides a means for mounting the various elements of my regulating and mixing mechanism within the casing 10. At opposite ends thereof are secured secondary casings 12 and 13, each comprising an outer vertical passageway 14, a horizontal passageway 15 and an inner vertical passageway 16, as best shown in Figs. 2 and 4. The outer passageways 14 connect through pipes 17 and 18, respectively, with the hot and cold water pipes which are controlled by the usual faucet valves 19. The descending passageways 16 have running from the lower portion thereof pipes 20 and 21, respectively, which unite in an enlarged pipe 22, said enlarged pipe 22 opening into a mixing box 23, shown in detail in Figs. 2, 3 and 6. This mixing box comprises a series of passageways 24, 25 and 26 and a port 27 opening from said passageways into the bottom of a chamber formed within casing 10. A discharge spout 28 is provided at one side of casing 10 about half way up the top thereof, so that when water has been turned on from the hot and cold pipes the casing will fill with thoroughly mixed water to a point adjacent the top of said spout 28, which will, in practice, be approximately two-thirds of the capacity of said chamber. A small opening 29 in the bottom of the chamber formed by the casing 10 permits the water in the casing to drain away when the bath tub is empty.

Within the horizontal passageways 15, in casings 12 and 13, will be positioned water wheels 30 of any desired type mounted upon a horizontal shaft 31 journaled in said casings 12 and 13 and in a center bearing 32 formed on a bracket 33 extending from a transverse frame-piece 34. The water wheels 30 will have the flanges thereof oppositely turned so that the combined force of the water passing through passages 15 will be utilized in turning shaft 31. The water wheels 30 may be very small, as not a great deal of power will be required to turn shaft 31. Upon shaft 31 are located a pair of worms 35 and 36, respectively, meshing with worm wheels 37 and 38 on shafts 39 and 40 journaled at right angles to shaft 31 in frame-piece 34 and another frame-piece 41 toward the front of the casing. Each of shafts 39 and 40 has thereon a bifurcated arm 42, as shown in Figs. 3 and 4, said bifurcated arms having journaled therein short shafts 43 upon which are fast outside of the bearing portions of arm 42 unequal spur gears 44 and 45, respectively. The spur gears 44 each mesh with spur gears 46 formed integrally on the hubs of spur gears 47, which hubs are loose on shafts 39 and 40, respectively, spur gears 47 both meshing with a segment rack 48 fast on a sleeve 49. The spur gears 45 mesh with spur gears 50 on hubs 51 and 52, loose on shafts 39 and 40, respectively. Hub 51 has thereon a ratchet wheel 53, and hub 52 a ratchet wheel 54. From the above it will be seen that each of the spur wheels 45 is revolved planetarily in mesh with a spur gear 50, and each of the spur gears 44 is correspondingly revolved, and at the same rate, planetarily in mesh with spur gear 46. The spur gears 46 and 50 are of relatively different size corresponding inversely to the difference in size of the respective spur gears 44 and 50. It follows, therefore, that there must be constant relative movement between spur gears 46 and 50, and since spur gears 50 are normally entirely free to rotate with the hubs 51 and 52 secured thereto upon shafts 39 and 40, while spur gears 46 are, through gears 47, held to the segment 48, the spur gears 46 and parts connected therewith will normally be stationary, while the spur gears 50 will rotate, the ratchets 53 and 54, therefore, being continuously driven. It is also to be noted that the worms 35 and 36 are reversely turned so that the drive of ratchet wheels 53 and 54 will be in opposite directions, as indicated by the arrows in Fig. 1. The aforesaid arrangement of differential and planetary gearing comprises, in combination with the double acting pawl later to be described, the motion governing mechanism broadly claimed in my said copending application.

As clearly indicated in Figs. 1 and 2, the segment 48 is pivotally connected by means of links 55 and 56 with pivoted arms 57 and 58, which arms are in turn connected by links 59 and 60 with arms 61 and 62 on valve stems 63 and 64 for operating wing valves 65 and 66 in the passages 14. The valves 65 and 66 are turned in opposite directions, so that movement of segment 48 will, through the connections above described, simultaneously open one valve and close the other in correspondence with the direction in which the segment is being moved. The sleeve 49 above referred to is journaled in bearings formed in bracket members 67 and 68, as best shown in Fig. 3. Fast on sleeve 49 is an arm 69 to which is pivotally connected, by means of ears 70, one end of a circular bimetallic thermostat 71. The other end of the thermostat 71 has thereon a short laterally extended arm 72, having thereon a pin 73 which extends through an aperture in a bifurcated member 74, having the lower part thereof straddling the sleeve 49. The member 74 is pivotally supported upon a stud 75 carried by a pin 76 extended through a slot 77 in the wall of sleeve 49 from a shaft 78 journaled in said sleeve 49. The member 74 is extended into a finger to which is pivotally attached at 79 a balanced or double pawl 80, said pawl having formed thereon guide lugs 81 which extend through guide slots 82 in a guide standard 83 which is fast on sleeve 49. It will be apparent that the pawl-holding member 74 is connected to move with sleeve 49 through the circular thermostat 71, and may be moved independently of said sleeve 49 upon the pivot stud 75 by means of the thermostat 71 or upon the pivot stud 73 by means of the shaft 78. For effecting the latter motion the shaft 78 has thereon an arm 84 with a marker 85 engageable in notches of a segment 86 on an arm 87 fast on sleeve 49. The notches of segment 86 correspond to temperature indications of a scale set in alinement above said segment and by shifting the marker 85 in said notches the temperature of the mixture to be delivered from the mixing device may be regulated and indicated, as will hereinafter appear.

In operation both of the faucets 19 are opened for delivering simultaneously hot and cold water into the respective vertical passages 14. The casing within chamber 10 immediately fills with the mixed water and the thermostat 71 is subjected to the temperature of this water. At the same time, through the water wheels 30 and connections from shaft 31, above described, the ratchets 53 and 54 will be rotated so that the adjacent peripheries thereof each travel downwardly, as indicated by the arrows. If the mixture passes the desired temperature, or vice versa, the thermostat 71 expands or contracts and swings the pawl-holder 74 upon the pivot 75, thereby swinging the pawl 80 so that the same is engaged by one or the other of the ratchets 53 or 54. This engagement with ratchet 54 simultaneously holds the ratchet from rotation, and through guide-pieces 81 in slots 82 locks the pawl 80 and holder 74 to the guide arm 83. The holding of the ratchet 53 causes the differential movement above referred to to be translated to one or the other of gears 47, which, being in mesh with segment 48, move said segment, thereby closing one and opening the other of valves 65 and 66 according to the direction in which the segment is moved. As segment 48 is moved, the sleeve 49, thermostat 71, arms 83 and 87, and, through arm 87, arm 84 and shaft 78 are moved in unison, which has the effect of withdrawing pawl 80 from engagement with ratchet wheel 53 or 54. When this takes place differential movement of a gear 47 is stopped and the movement again translated to the ratchet 53 or 54. If the thermostat continues to act in the same direction, the pawl 80 will again be brought into engagement with the ratchet previously engaged and the operation repeated until a condition of balance is secured, that is, until water of the desired temperature is being delivered. If too much of either cold or hot water is brought into the mixture so as to reduce the temperature too largely, the thermostat will effect the reverse operation by bringing the pawl into engagement with the other ratchet, which will be continued until balanced and even temperature are again established. The governing action, it will be seen, is entirely automatic, is delicate and accurate because simultaneously with a change in the condition to be governed effected by the governing means the said governing means is withdrawn from actuating position.

My temperature governor mechanism can not only be used for the purpose of regulating the temperature of a mixture of fluids at the time when said mixture is formed or regulating a mixture of fluids formed by the flow of fluids at different temperatures from several sources, but a device embodying the principles of this invention will be found particularly advantageous where a body of fluid in position in a tank or vat is to be raised or lowered to a given temperature by the introduction of hot or cold fluid and then held at that temperature. In such a case my invention would need to control a source of supply of only one fluid. If, for example, a vat containing dye-liquids or brewing products was to be brought up to a certain temperature and kept at that temperature for a given period of time by means of the introduction of a hot fluid such as water or steam, the temperature governor would need to have connection only with the valve for admitting such hot fluid. It would then admit the hot fluid until the temperature of the contents of the vat had been raised to the desired point, when the temperature governor would effect complete closure of the valve, only opening the same subsequently when the temperature of the contents of the vat fell below the desired point, and then only to the extent necessary to maintain the temperature practically constant at the degree sought.

It will be noted that the water wheels referred to as a means for operating the mechanism for actuating the valves are illustrated as a convenient means of effecting such operation in which the power is derived from the fluid admitted to the tank or vat. It will be obvious, however, that any form of driving mechanism such as an electric motor may be applied with equal efficiency for that purpose, and when the temperature governor is employed for regulating the contents of the vat or tank it may be desirable to operate the driving mechanism from a continuously driven source of power.

I claim:

1. A temperature governor for fluids comprising a casing forming a mixing chamber, hot and cold water pipes for delivering through separate ducts into the mixing chamber, valves for controlling the flow of water through said pipes, a power driven mechanism adapted to open one valve and close the other, or vice versa, said mechanism being normally inoperative to effect movement of the valves, a thermostat positioned to be acted upon by the temperature of the mixture, means controlled by the thermostat for rendering said mechanism operative, and automatic means for terminating operation of the valves when the same have been moved a distance proportional to the extent of movement of the thermostat.

2. In a temperature governor for fluids, the combination with a body for containing liquid, a hot water pipe and a cold water pipe for delivering water into said body, valves for controlling the flow of water through said pipes, a motor actuated by the passage therethrough of the fluid the temperature of which is to be regulated, mechanism operative by said motor, normally inoperative connections therefrom adapted to open one valve and close the other, and a thermostat so positioned as to be acted upon by the temperature of the mixture and means movable by the thermostat for rendering said connections operative.

3. A temperature governor for fluids comprising a casing forming a mixing chamber, hot and cold water pipes for delivering through separate ducts into the mixing chamber, valves for controlling the flow of water through said pipes, a motor actuated by the passage of fluids through said ducts, mechanism operated by said motor, including two oppositely driven ratchets for opening one valve and closing the other, said mechanism being normally inoperative but being rendered operative whenever a ratchet is held from movement and being operative in opposite directions when the respectively opposite ratchets are held, a thermostat positioned to be acted upon by the temperature of the mixture, and means moved by the thermostat for engaging and holding either of said ratchets.

4. A temperature governor for fluids comprising a casing forming a mixing chamber, valves for admitting and controlling the flow of hot and cold streams through separate ducts into said mixing chamber, means for moving the valves, a thermostat positioned to be acted upon by the temperature of the mixture and connections therefrom for rendering the moving means operative, and automatic means for terminating operation of the moving means when the valves have been moved a distance proportional to the extent of movement of the thermostat.

5. A temperature governor for fluids comprising a casing forming a mixing chamber, hot and cold water pipes for delivering through separate ducts into the mixing chamber, valves for controlling the flow of water through said pipes, means including a continuously moving ratchet wheel for opening one valve and closing the other, said means being rendered operative by stopping of the ratchet wheel, a thermostat positioned to be acted upon by the temperature of the mixture, and means moved by the thermostat for engaging and holding said ratchet.

6. A temperature governor for fluids comprising a casing forming a mixing chamber, hot and cold water pipes for delivering through separate ducts into the mixing chamber, valves for controlling the flow of water through said pipes, means including a continuously moving ratchet wheel for opening one valve and closing the other, said means being rendered operative by stopping of the ratchet wheel, a thermostat positioned to be acted upon by the temperature of the mixture, means moved by the thermostat for engaging and holding said ratchet, and means connecting said engaging means for movement with the valves whereby operation of the valves will withdraw the engaging means from engagement with the ratchet.

7. A temperature governor for fluids comprising a casing forming a mixing chamber, hot and cold water pipes for delivering through separate ducts into the mixing chamber, valves for controlling the flow of water through said pipes, continuously driven mechanism, including a ratchet, for simultaneously opening one valve and closing the other, or vice versa, said mechanism being normally inoperative but being rendered operative whenever the ratchet is held from movement, a thermostat positioned to be acted upon by the temperature of the mixture, and a pawl moved by the thermostat for engaging and holding said ratchet.

8. A temperature governor for fluids comprising a casing forming a mixing chamber, hot and cold water pipes for delivering through separate ducts into the mixing chamber, valves for controlling the flow of water through said pipes, continuously driven mechanism, including a ratchet for opening one valve and closing the other, or vice versa, said mechanism being normally inoperative but being rendered operative whenever the ratchet is held from movement, a thermostat positioned to be acted upon by the temperature of the mixture, a pawl moved by the thermostat for engaging and holding said ratchet, and means for clutching said pawl to move with the valve actuating means and withdraw the same from engagement with the ratchet.

9. A temperature governor for fluids comprising a casing forming a mixing chamber, hot and cold water pipes for delivering through separate ducts into the mixing chamber, valves for controlling the flow of water through said pipes, power driven mechanism, including two oppositely driven ratchets for opening one valve and closing the other, said mechanism being normally inoperative but being rendered operative whenever a ratchet is held from movement and being operative in opposite directions when the respective opposite ratchets are held, a thermostat positioned to be acted upon by the temperature of the mixture, and a double pawl positioned between the ratchets adapted to be moved by the thermostat for engaging and holding either of said ratchets.

10. A temperature governor for fluids comprising a casing forming a mixing chamber, hot and cold water pipes for delivering through separate ducts into the mixing chamber, valves for controlling the flow of water through said pipes, power driven mechanism, including two oppositely driven ratchets for opening one valve and closing the other, said mechanism being normally inoperative but being rendered operative whenever a ratchet is held from movement and being operative in opposite directions when the respective opposite ratchets are held, a thermostat positioned to be acted upon by the temperature of the mixture, a double pawl positioned between the ratchets adapted to be moved by the thermostat for engaging and holding either of said ratchets, and means for clutching said pawl to move with the valve actuating means and withdraw the same from engagement with the ratchet.

11. A temperature governor for fluids comprising a casing forming a mixing chamber, a mixing box in said chamber having a tortuous passageway, means for introducing hot and cold water from separate sources through a common duct into said mixing box, a thermostat in the casing, a discharge pipe leading from the casing at a point above the thermostat, valves and power driven means for positively operating the same for controlling the proportional flow of hot and cold water, and means actuated by the thermostat for controlling said operating means.

12. A temperature governor for fluids comprising means for supplying and mixing hot and cold streams of water, valves for separately controlling said streams, means for simultaneously opening one valve and closing the other, means including a continuously moving ratchet wheel for operating said member, said means being rendered operative by stopping of the ratchet wheel, a thermostat carried by and movable with the member positioned to be acted upon by the temperature of the mixture, an arm pivotally carried by the member and pivotally connected with an end of the thermostat to be moved thereby, and a pawl on the end of the arm for engaging and stopping the ratchet.

13. A temperature governor for fluids comprising means for supplying and mixing hot and cold streams of water, valves for controlling said streams, means for opening one valve and closing the other, means including a continuously moving ratchet wheel for operating said member, said means being rendered operative by stopping of the ratchet wheel, a thermostat carried by and movable with the member positioned to be acted upon by the temperature of the mixture, an arm pivotally carried by the member and pivotally connected with an end of the thermostat to be moved thereby, a pawl on the end of the arm for engaging and stopping the ratchet, a slotted guide fast on the member, and means on the pawl engageable in said slots for clutching the pawl to the guide when the pawl is engaged by the ratchet wheel.

14. A temperature governor for fluids comprising means for supplying and mixing hot and cold streams of water, valves for controlling said streams, means for opening one valve and closing the other, means including a continuously moving ratchet wheel for operating said member, said means being rendered operative by stopping of the ratchet wheel, a thermostat carried by and movable with the member positioned to be acted upon by the temperature of the mixture, an arm pivotally carried by the member and pivotally connected with an end of the thermostat to be moved thereby, a pawl on the end of the arm for engaging and stopping the ratchet, and means for clutching the pawl to move with the member when the pawl is engaged by the ratchet.

15. A temperature governor for fluids comprising means for supplying and mixing hot and cold streams of water, valves for controlling said streams, means for opening one valve and closing the other, means including a continuously moving ratchet wheel for operating said member, said means being rendered operative by stopping of the ratchet wheel, a thermostat carried by and movable with the member positioned to be acted upon by the temperature of the mixture, an arm pivotally carried by the member and pivotally connected with an end of the thermostat to be moved thereby, a pawl on the end of the arm for engaging and stopping the ratchet, and means for varying the position of the arm and pawl relative to the ratchet and thermostat to regulate the temperature of the mixture being delivered.

16. A temperature governor for fluids comprising means for supplying and mixing hot and cold streams of water, valves for controlling said streams, an oscillating sleeve and connections for opening one valve and closing the other, means including a continuously moving ratchet wheel for operating said sleeve, said means being rendered operative by stopping of the ratchet wheel, a bimetallic arc-shaped thermostat having pivotal connection at one end with the sleeve, a shaft journaled in the sleeve, a projection on the shaft, an arm pivotally mounted on the free end of the thermostat and said projection, a pawl carried by the arm and moved by the thermostat to engage the ratchet arm on the shaft, and a notched scale having connection with the sleeve for locking the shaft to rotate with the arm.

17. A temperature governor for fluids comprising a casing forming a mixing chamber, a pair of valve chambers in the casing, one having connection with a source of supply of hot water and the other with a source of supply of cold water, a shaft journaled in said valve casings, a water wheel on each end of the shaft within each valve casing to be acted upon by the water flowing through the same, valves in each casing, means actuated by the shaft for opening one valve and closing the other, a thermostat positioned to be acted upon by the temperature of the mixture of fluids, and connections therefrom for controlling the actuation of said valve-operating means.

18. A temperature governor for fluids comprising a casing forming a mixing chamber, hot and cold water pipes for delivering through separate ducts into the mixing chamber, valves for controlling the flow of water through said pipes, a power-driven mechanism adapted to open one valve and close the other, or vice versa, said mechanism being normally inoperative to effect movement of the valves, a thermostat positioned so as to be acted upon by the temperature of the mixture, means controlled by the thermostat for rendering said mechanism operative, and means for automatically terminating the operation of the valves when the same have been moved a distance proportional to the movement of the thermostat.

19. A temperature governor for fluids comprising a casing forming a mixing chamber, hot and cold water pipes for delivering through separate ducts into the mixing chamber, valves for controlling the flow of water through said pipes, a power-driven mechanism adapted to open one valve and close the other, or vice versa, said mechanism being normally inoperative to effect movement of the valves, a thermostat positioned to be acted upon by the temperature of the mixture, mechanical devices controlled by the thermostat for rendering said mechanism operative, and mechanism for automatically terminating operation of the valves when the same have been moved a distance proportional to the movement of the thermostat.

20. A temperature governor for fluids comprising a casing forming a mixing chamber, hot and cold water pipes for delivering through separate ducts into the mixing chamber, valves for controlling the flow of water through said pipes, a power-driven mechanism adapted to open one valve and close the other, or vice versa, said mechanism being normally inoperative to effect movement of the valves, a thermostat positioned within the chamber to be acted upon by the temperature of the mixture, mechanical devices controlled by the thermostat for rendering said mechanism operative, and mechanism for automatically terminating operation of the valves when the same have been moved a distance proportional to the movement of the thermostat, all of said controlling and terminating mechanism being situated within the casing.

In testimony whereof I affix my signature in presence of two witnesses.

KENNEDY DOUGAN.

Witnesses:
H. A. BOWMAN,
ROBERT W. MUIR.